(12) United States Patent
Elliott

(10) Patent No.: US 10,052,573 B2
(45) Date of Patent: Aug. 21, 2018

(54) APPARATUS AND METHOD FOR WATER TREATMENT VIA VERTICAL WATER MOVEMENT THROUGH A FUNNEL

(71) Applicant: WEARS X PTY LTD, Toogoolawah (AU)

(72) Inventor: Stephen Elliott, Toogoolawah (AU)

(73) Assignee: WEARS X PTY LTD, Toogoolawah (AU)

( * ) Notice: Subject to any disclaimer, the term of this patent is extended or adjusted under 35 U.S.C. 154(b) by 677 days.

(21) Appl. No.: 14/404,004

(22) PCT Filed: Jun. 3, 2013

(86) PCT No.: PCT/AU2013/000580
§ 371 (c)(1),
(2) Date: Nov. 25, 2014

(87) PCT Pub. No.: WO2013/177632
PCT Pub. Date: Dec. 5, 2013

(65) Prior Publication Data
US 2015/0101989 A1    Apr. 16, 2015

(30) Foreign Application Priority Data

Jun. 1, 2012    (AU) ................ 2012902287

(51) Int. Cl.
*C02F 1/00*     (2006.01)
*B01F 13/00*    (2006.01)
(Continued)

(52) U.S. Cl.
CPC ......... *B01D 29/085* (2013.01); *B01D 29/603* (2013.01); *B01F 5/0415* (2013.01);
(Continued)

(58) Field of Classification Search
CPC ........ B01F 5/0415; B01F 5/0428; B01F 5/12; B01F 5/04; B01F 7/16; B01F 7/22;
(Continued)

(56) References Cited

U.S. PATENT DOCUMENTS

| 4,033,704 A | 7/1977 | Wadge et al. |
| 4,033,875 A | 7/1977 | Besik |

(Continued)

FOREIGN PATENT DOCUMENTS

| AU | 199954978 | 3/2000 |
| JP | 2002/186962 | 7/2002 |
| WO | 2003/033123 | 4/2003 |

OTHER PUBLICATIONS

PCT International Search Report dated Sep. 6, 2013 for PCT/AU2013/000580 filed on Jun. 3, 2013 in the name of Stephen Elliott.

(Continued)

*Primary Examiner* — Hayden Brewster
(74) *Attorney, Agent, or Firm* — Steinfl + Bruno LLP

(57) ABSTRACT

An apparatus for treating water in a reservoir includes a funnel. A support assembly supports the funnel in a lengthwise upright orientation when the funnel is submerged. A water moving arrangement is arranged to move water through the funnel in a direction from an inlet at an upper end of the funnel towards an outlet at lower end of the funnel.

16 Claims, 13 Drawing Sheets

(51) Int. Cl.
*B01F 15/00* (2006.01)
*B01D 29/085* (2006.01)
*C02F 1/68* (2006.01)
*B01F 7/16* (2006.01)
*B01F 7/22* (2006.01)
*B01F 5/04* (2006.01)
*B01D 29/60* (2006.01)
*C02F 1/52* (2006.01)
*C02F 1/76* (2006.01)
*C02F 103/00* (2006.01)
*C02F 3/20* (2006.01)

(52) U.S. Cl.
CPC ............ *B01F 5/0428* (2013.01); *B01F 7/168* (2013.01); *B01F 7/22* (2013.01); *B01F 13/0049* (2013.01); *B01F 15/00915* (2013.01); *C02F 1/008* (2013.01); *C02F 1/686* (2013.01); *C02F 1/52* (2013.01); *C02F 1/76* (2013.01); *C02F 3/207* (2013.01); *C02F 2103/007* (2013.01); *C02F 2201/008* (2013.01); *C02F 2209/005* (2013.01); *C02F 2209/008* (2013.01); *C02F 2209/02* (2013.01); *C02F 2209/06* (2013.01); *C02F 2209/29* (2013.01); *C02F 2209/40* (2013.01); *C02F 2301/022* (2013.01); *E03C 2201/40* (2013.01); *Y02W 10/15* (2015.05)

(58) Field of Classification Search
CPC ...... B01F 7/168; B01F 13/00; B01F 13/0049; B01F 15/00; B01F 15/00915; B01D 17/12; B01D 21/30; B01D 21/302; B01D 21/305; B01D 29/085; B01D 29/603; B01D 35/14; B01D 2311/00; B01D 2311/10; B01D 2311/14; B01D 2311/18
See application file for complete search history.

(56) References Cited

U.S. PATENT DOCUMENTS

| | | | | |
|---|---|---|---|---|
| 4,192,740 | A | * | 3/1980 | Savard ................ B01F 3/04609 210/614 |
| 4,259,267 | A | * | 3/1981 | Wang .................... C02F 3/1294 210/219 |
| 5,549,828 | A | | 8/1996 | Ehrlich |
| 5,857,955 | A | * | 1/1999 | Phillips ................. B04B 1/2016 494/5 |
| 6,533,496 | B1 | * | 3/2003 | Elliott ...................... C02F 7/00 210/170.09 |
| 6,818,124 | B1 | | 11/2004 | Simmons |
| 7,850,443 | B2 | | 12/2010 | Eigler |
| 2003/0127754 | A1 | * | 7/2003 | Ruzicka ............... B01F 3/04773 261/93 |
| 2004/0226615 | A1 | * | 11/2004 | Morikawa ........... G05D 7/0635 137/487.5 |
| 2008/0128344 | A1 | * | 6/2008 | Tormaschy ......... B01F 3/04609 210/170.05 |

OTHER PUBLICATIONS

PCT Written Opinion dated Sep. 6, 2013 for PCT/AU2013/000580 filed on Jun. 3, 2013 in the name of Stephen Elliott.

\* cited by examiner

APPARATUS AND METHOD FOR WATER TREATMENT VIA VERTICAL WATER MOVEMENT THROUGH A FUNNEL

CROSS REFERENCE TO RELATED APPLICATIONS

The present application is the US national stage of International Patent Application PCT/AU2013/000580 filed on Jun. 3, 2013 which, in turn, claims priority to Australian Patent Application No. 2012902287 filed on Jun. 1, 2012.

FIELD

Various exemplary embodiments of an apparatus and a method for treating water in a reservoir are described herein.

BACKGROUND OF THE INVENTION

It is known that vertical water movement in a body of water can be beneficial for various reasons. These include the removal of stagnant water zones and the elimination of thermal strata or thermoclines.

Various apparatus have been developed to achieve such movement. These generally comprise some form of conduit that directs water vertically and usually upwardly. However, there are difficulties in achieving such movement across a sufficient area without having to use more apparatus. As a result, it can be costly both from an equipment and power point of view to achieve a suitable extent of movement across a body of water.

In many cases, it is necessary to dose the water with suitable chemicals or water treatment compounds in order to achieve a suitable water quality. In these cases, it can be difficult to achieve a suitable distribution of such compounds throughout the body of water.

SUMMARY

Various exemplary embodiments of an apparatus for treating water in a reservoir include a funnel;

a support assembly for supporting the funnel in a lengthwise upright orientation when the funnel is submerged; and a water moving arrangement that is arranged to move water through the funnel in a direction from an inlet at an upper end of the funnel towards an outlet at lower end of the funnel.

The support assembly may include a float assembly for keeping the apparatus afloat in the reservoir.

The apparatus may include a dosing arrangement that is operatively arranged with respect to a mouth or inlet of the funnel. The dosing arrangement can be configured to introduce or entrain dosing compounds, reagents or other water treatment chemicals or products into the water upstream of the water moving arrangement. The dosing arrangement may be at the inlet of the funnel. The dosing arrangement may be positioned at or near the inlet. The inlet may be configured so that water pressure drops below atmospheric pressure as a result of flow of water into the funnel. Thus, the dosing arrangement may be configured so that dosing compound can be fed by atmospheric pressure into the water.

The funnel may be generally circular in transverse section along its length. The funnel may be shaped so that the funnel tapers radially inwardly from either end towards a cylindrical waist portion.

The dosing arrangement may include a dosing conduit in the form of a tubular ring that is mounted on or at the inlet of the funnel. The ring may be in fluid communication with a supply of dosing compound or chemical via a feed conduit. A series of nozzles may be mounted on the ring. The nozzles may extend into the inlet and may be configured so that dosing compounds or chemicals are fed in the direction of water flow.

The water moving arrangement may include a driving arrangement and an impeller connected to the driving arrangement. The impeller may be located within the waist portion.

The driving arrangement may include a rotary motor that is mounted above the upper end of the funnel. A shaft may be coupled to the motor at one end and to the impeller at its other end. The shaft may have an axial length that enables the impeller to be positioned within the waist portion of the funnel. The driving arrangement may include a transmission that couples the rotary motor to the shaft.

A flow guide structure may be mounted in the funnel. The flow guide structure may be located upstream of the impeller. The flow guide structure may include flow guide vanes. The vanes may be shaped and sized to inhibit swirl generated by the impeller.

A support structure may extend from the flow guide structure. The support structure may project from the inlet. The motor may be mounted on the support structure so that the motor is clear of water when the funnel is submerged. The vanes may extend from a hollow, elongate hub. The shaft may extend through the hub to engage the impeller.

The support assembly may include a plurality of arms that are mounted at inner ends to the support structure in a pivotal manner. The arms may be pivotally displaceable towards and away from the upper end of the funnel. The plurality of arms may include three or four arms that are spaced apart in an equiangular fashion about the funnel.

A float may be mounted on each arm. Each float may be elongated and may extend substantially along an entire length of each arm. A limiting or stop mechanism may be engaged with the arms to limit an extent to which the arms are able to pivot away from the funnel. The limiting mechanism can be adjusted and regulated.

The floats and arms may be configured to deploy by pivoting outwardly as the funnel is lowered into the water.

The floats and arms may be shaped to fold and nest against the funnel to allow for insertion into a reservoir hatch opening.

The apparatus may include a control system. The control system may be configured for controlling a rotational speed of the motor and consequently the flow velocity. The control system may include a programmable controller and a variable speed drive that is controlled by the controller. The controller may be configured for connection to one or more sensors. The controller may be configured to control the speed of the motor in response to signals generated by the sensor/s.

The apparatus may include a dosing system for introducing a dosage of a water treatment compound or product into the water passing through the funnel. The dosing system may include a dosing pump and a transducer, such as a ph-sensor, or chlorine sensor, or other water parameter sensor or thermistor, which is interfaced with the controller. The controller may be configured to control a dosage amount of the water treatment compound by varying the dosing pump speed in response to the transducer.

The dosing system may include the feed conduit that opens into the dosage conduit.

A method for treating water in a reservoir, the method including the steps of placing at least one of the apparatus in the reservoir; and adjusting a speed of the motor and thus a flow rate of water through the funnel based on signals received from the sensor/s.

DESCRIPTION OF EMBODIMENTS

Figure 1:
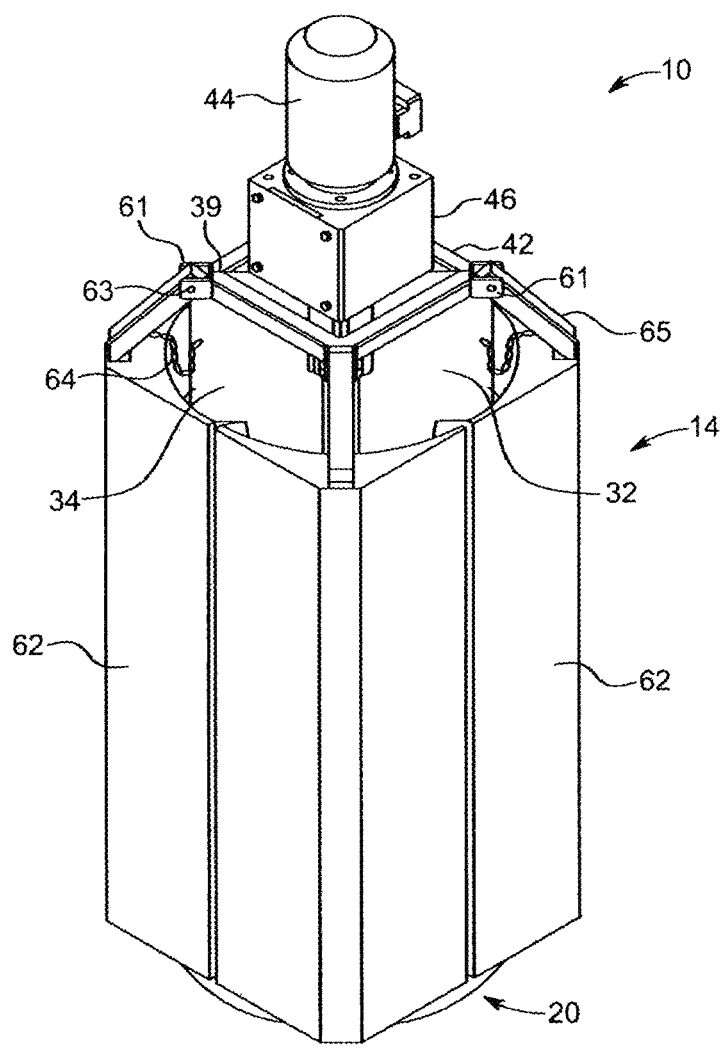
FIG. 1 is a three dimensional view of an exemplary embodiment of an apparatus for treating water in a reservoir, the apparatus being in an inoperative, pre-installed condition.

In the drawings, reference numeral 10 generally indicates an apparatus, in accordance with the invention, for inducing water movement in a reservoir and for dosing water with dosing compounds, products or chemicals. Thus, the apparatus 10 is suitable for water treatment.

Broadly, the apparatus 10 includes a funnel 12, a float assembly 14 for orientating the funnel 12 in an lengthwise upright orientation when the funnel 12 is submerged, and a water moving arrangement 16 that is arranged to move water through the funnel 12 from an inlet 18 at an operatively upper end of the funnel 12 towards an outlet 20 at an operatively lower end of the funnel 12.

The funnel 12 is generally circular cylindrical in transverse section. A side wall 24 of the funnel 12 is shaped so that the funnel 12 tapers radially inwardly from both ends to form an upper frusto-conical portion 26, a waist portion 28, and a lower frusto-conical portion 30 tapering outwards. The upper portion 26 is axially longer than the lower portion 30, and the waist portion 28 is axially shorter than the portions 26, 30 and is generally circular cylindrical.

Figure 11:
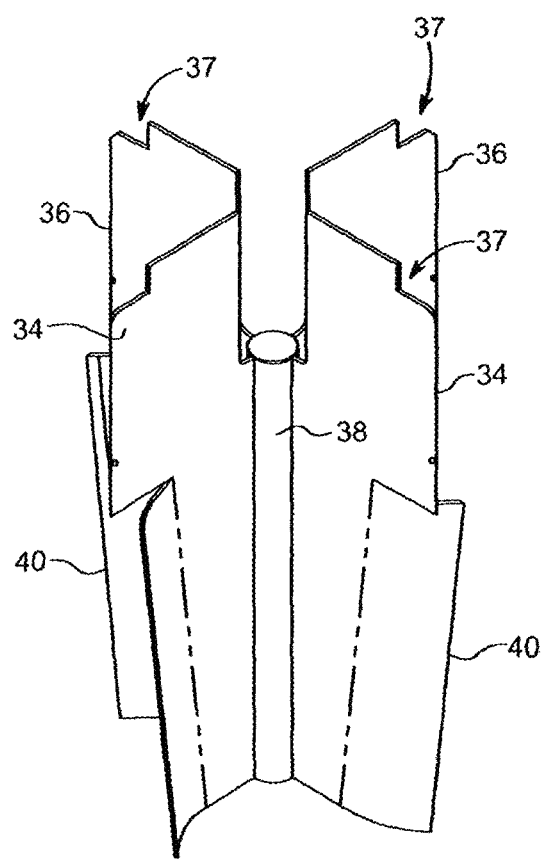
FIG. 11 shows a three-dimensional view of an exemplary embodiment of a flow guide structure for the apparatus.

A flow guide structure 32 is mounted in the funnel 12. Detail of the flow guide structure 32 can be seen in FIG. 11. The flow guide structure 32 includes four vanes 34 that extend radially from a central, elongate hollow hub 38. The inventor envisages that the flow guide structure 32 could include less than four vanes or more than four vanes, depending on requirements.

Each vane 34 has an upstream planar portion 36 and a downstream radially curved portion 40 so that water passing over the vanes 34 experiences a pre-swirl effect.

The flow guide structure 32 is mounted in the funnel 12 so that lower edges of the planar portions 36 are generally aligned with the upper end of the funnel 12.

A motor 44 and a bearing housing or drive casing 46 are mounted on upper edges of the planar portions 36.

Figure 6:
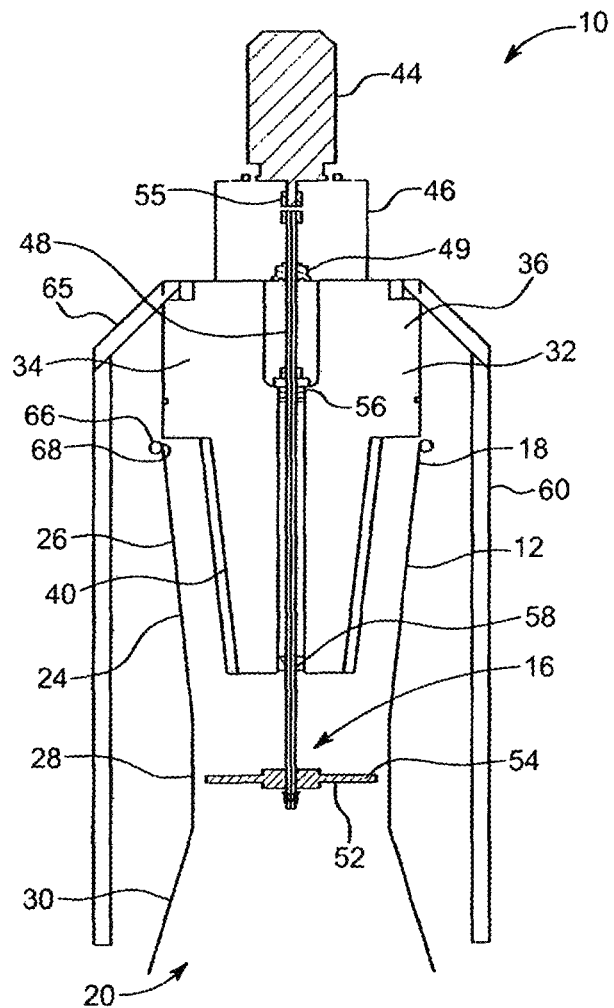
FIG. 6 shows a schematic sectioned side view of the apparatus taken through VI-VI in FIG. 5.
Figure 7:
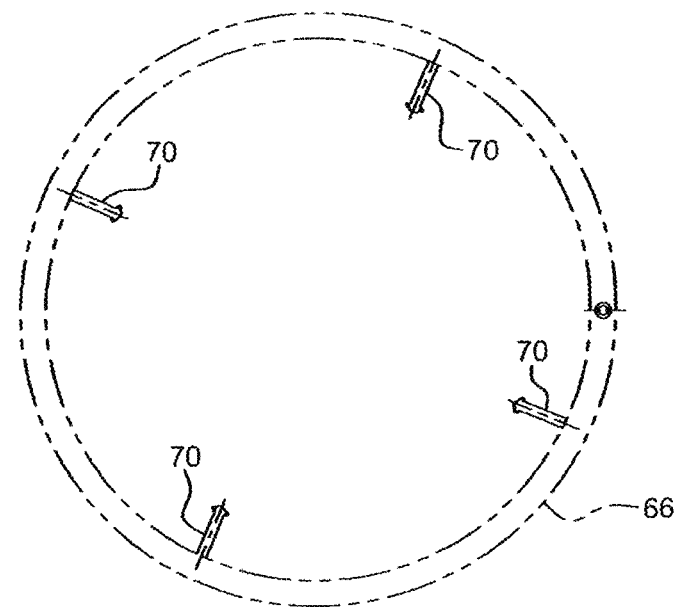
FIG. 7 shows a plan view of an exemplary embodiment of a dosing arrangement of the apparatus.
Figure 8:
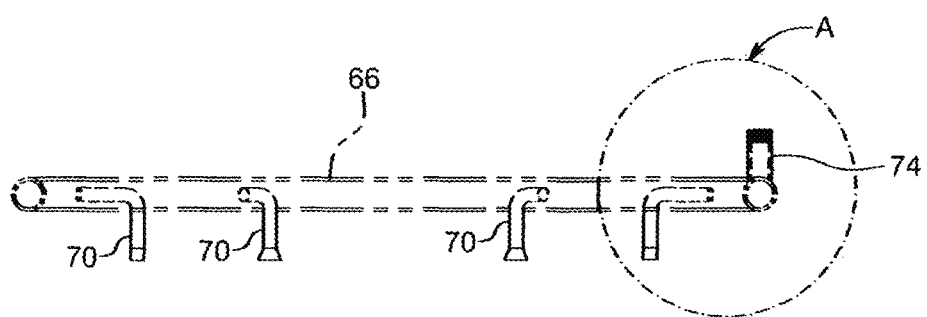
FIG. 8 shows a side view of the dosing arrangement with lines partially broken to show dosing nozzles of the arrangement.
Figure 9:
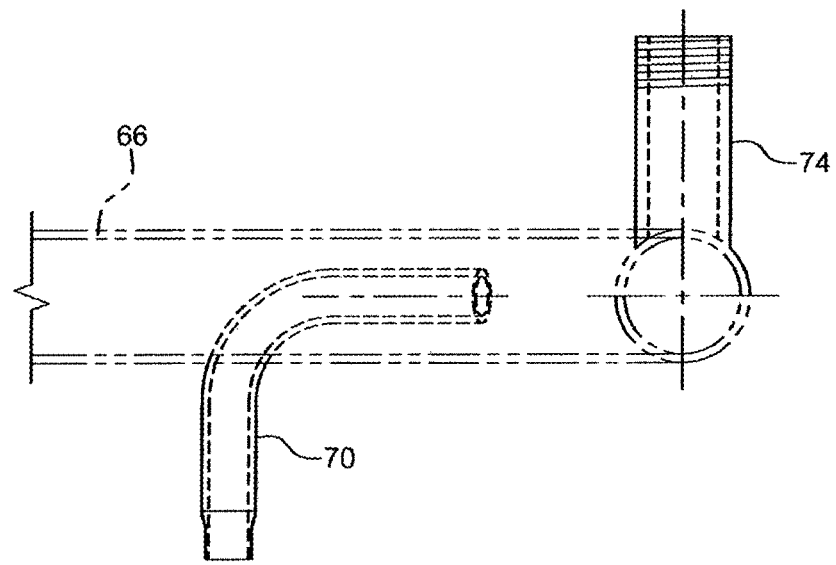
FIG. 9 shows a detail "A" in FIG. 8.
Figure 10:
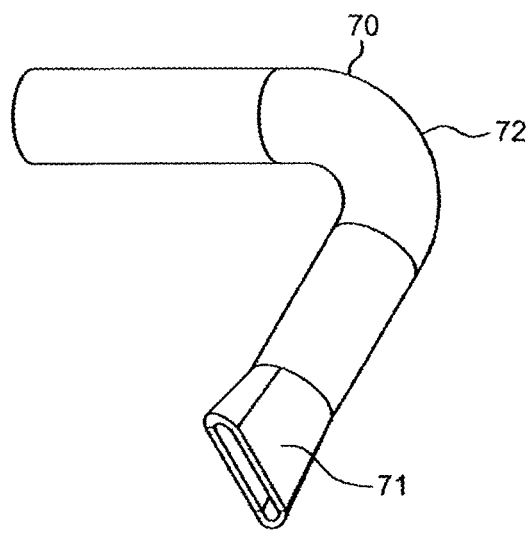
FIG. 10 shows a dosing nozzle of the dosing arrangement.
Figure 12:
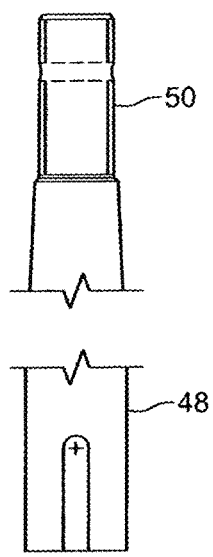
FIG. 12 shows a side view of an exemplary embodiment of a drive shaft for the apparatus.

A drive shaft 48, details of which can be seen in FIGS. 6 and 12, extends into the bearing housing 46 and has a suitable mounting formation or arrangement 50 so that it can be connected to the motor 44 with a split or flexible coupling 55. The drive shaft 48 extends through a bearing 49 in a wall of the casing 46. The drive shaft 48 also extends through a collar and bearing arrangement 56 between the planar portions 36 and through a bearing 58 at a discharge end of the flow guide structure 32. This facilitates location and rotation of the shaft 48 relative to the flow guide structure 32.

Figure 13:
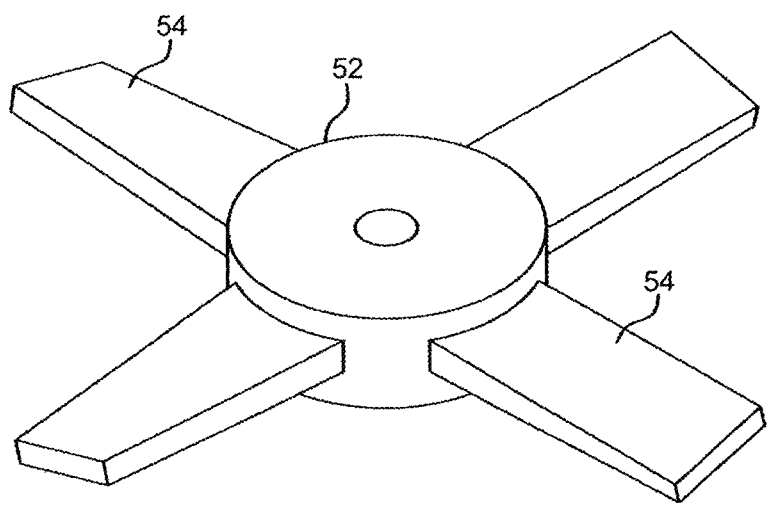
FIG. 13 shows a three-dimensional view of an exemplary embodiment of an impeller for the apparatus.

The drive shaft 48 extends through the hub 38 and is keyed to an impeller, in the form of an axial flow impeller 52, shown in FIG. 13. The impeller 52 has blades 54 that are oriented so that rotation of the drive shaft 48 draws water down the funnel 12 and out of the lower end of 20 of the funnel 12. The blades 54 can be of a number of different materials. These can include potable grade phosphor bronze, carbon fibre, plastic composite or any other material that might be suitable. The flow guide structure 32 serves to inhibit the generation of a vortex arid resultant cavitation. Furthermore, the curved portions 40 generate a pre-swirl that also inhibits cavitation. This can enhance flow efficiency through the funnel 12 by reducing turbulence. As a result, electrical pumping efficiency through the funnel 12 is enhanced.

The impeller 52 is located in the waist portion 28. Thus, water flowing through the funnel 12 is initially compressed as it passes through the impeller 52 and then expands as a result of the increasing diameter of the lower portion 30.

The vanes 34 and the hub 38 can be of any number of materials suitable for extended periods of immersion in water. Such materials could include stainless steel, aluminium, various plastics materials, fibreglass, carbon fibre and similar materials.

The vanes 34 are arranged in an equiangular fashion with respect to each other. However, the inventor envisages that other arrangements are also possible.

Outer edges of the vanes 34 taper to correspond with the upper portion 26 of the funnel 12 for snug fitment of the flow guide structure inside the funnel 12. Once inserted, the vanes 34 can be welded or otherwise fastened to the inside of the funnel sidewall 24. The inventor envisages that a number of different methods of fabrication can be used to fabricate or manufacture the funnel 12, the vanes 34 and the hub 38. For example, these components could be moulded as a unitary structure. Alternatively, the components could be moulded and subsequently assembled as a semi-unitary structure. When of metal, such as stainless steel, the vanes 34 are welded to the sidewall 24.

A rectangular or square support frame 42 is mounted on the flow guide structure 32 on upper edges of the planar portions 36. Each portion 36 defines a recess 37 to accommodate a corner 39 of the frame 42.

Figure 2:
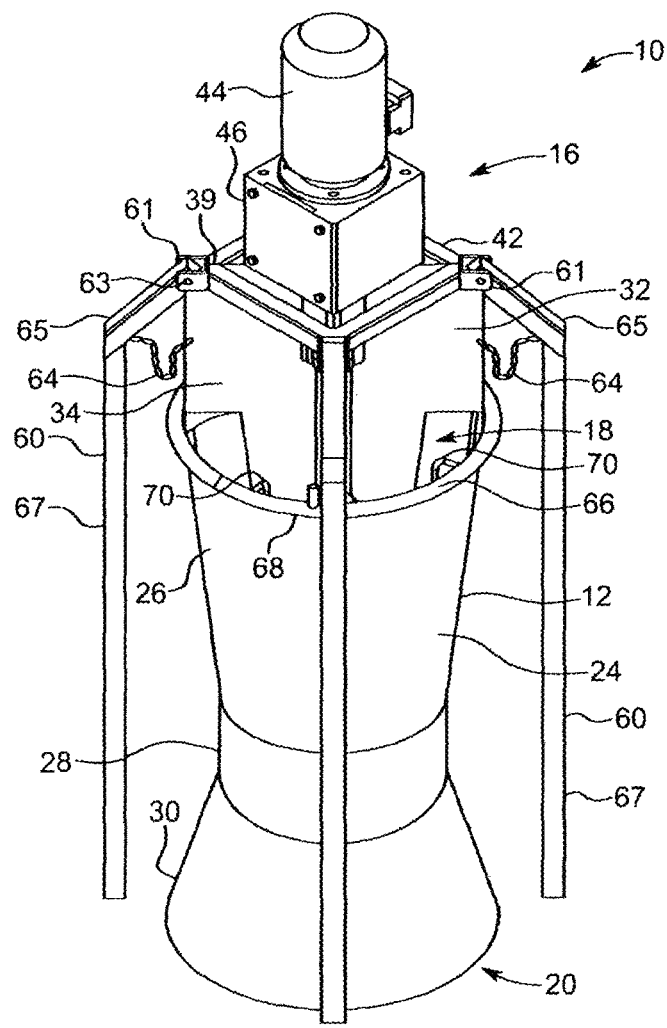
FIG. 2 shows a three-dimensional view of the apparatus of FIG. 1 with floats removed for clarity.
Figure 3:
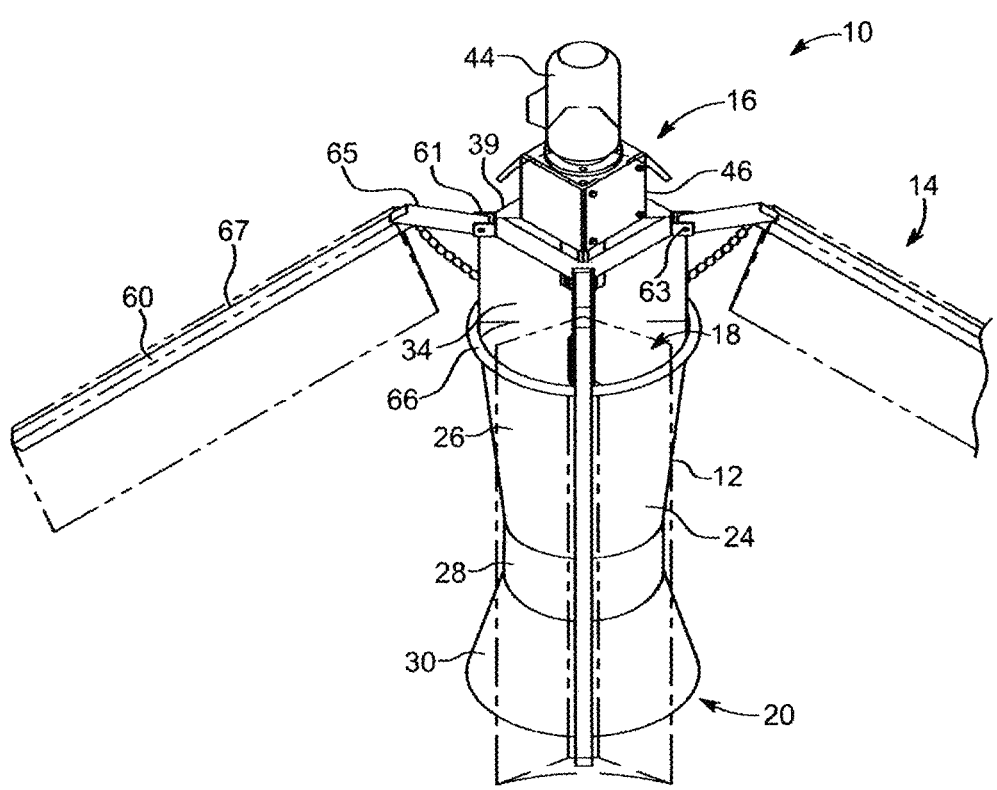
FIG. 3 shows a three-dimensional view of the apparatus of FIG. 1 in an operative condition with the floats deployed.
Figure 4:
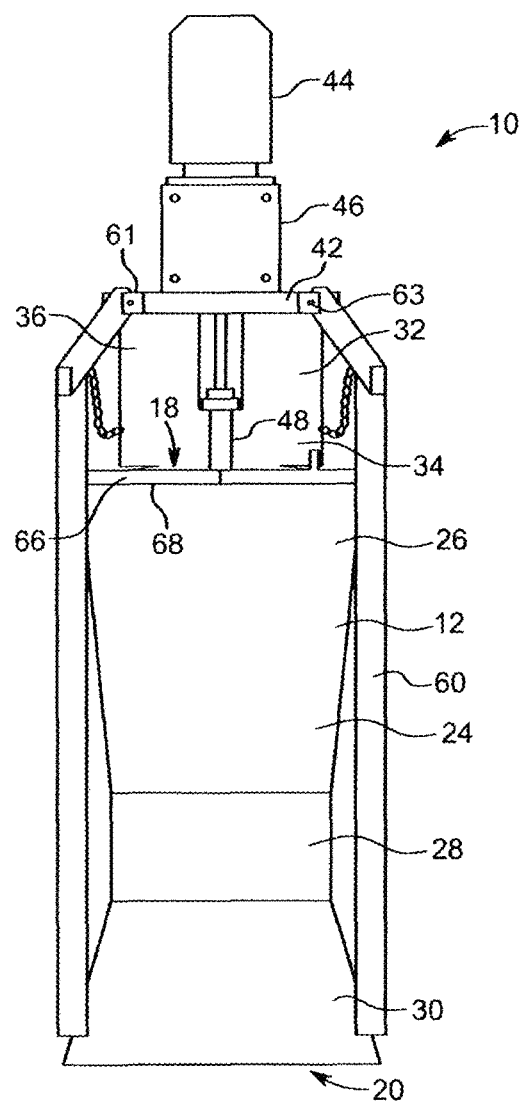
FIG. 4 shows a side view of the apparatus.
Figure 5:
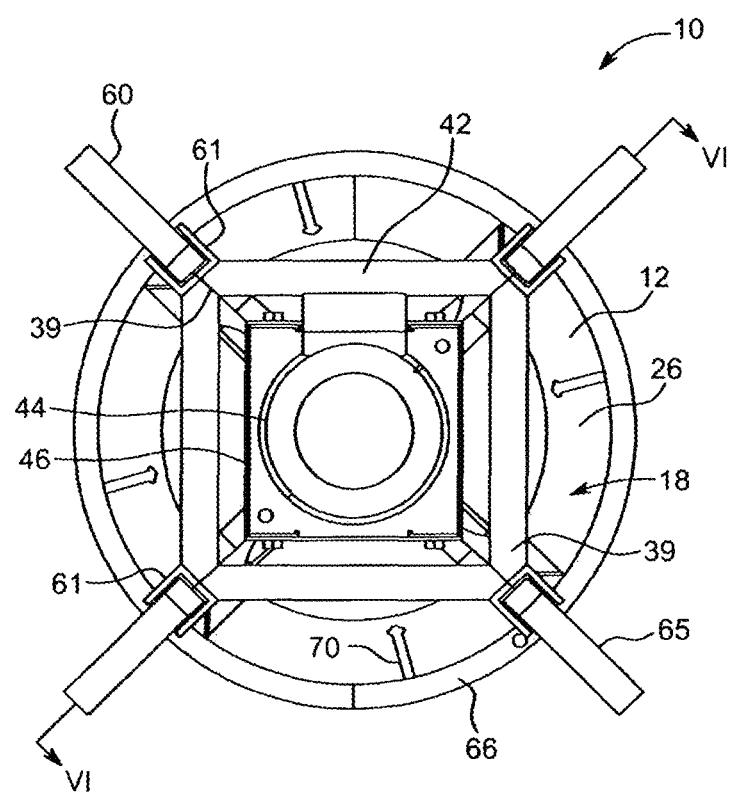
FIG. 5 shows a plan view of the apparatus.

The float assembly 14 includes four elongated arms 60 formed from metal bars or the like. The arms 60 are mounted at their one ends, at 56, in a pivotal manner, to the corners 39 of the support frame 42. To that end, a bracket 61 is arranged on each corner of the frame 42. A pivot pin 63 extends through each bracket 61 and an inner end of an associated arm 60 so that the arm 60 can pivot with respect to the bracket 61. Each arm 60 has an inner portion 65 and an outer portion 67, the portions 65, 67 being angled with respect to each other so that the arms 60 do not interfere with the funnel 12, when inoperative. The arms 60 are able to pivot between the position shown in FIG. 2 to the position shown in FIG. 3. The arms 60 are spaced apart in an equiangular fashion.

A float 62 is mounted on each arm 60. Each float 62 is elongated and generally triangular in cross section with an arcuate inner surface as can be seen in FIG. 1. The floats 62 extend along substantially the entire length of the arms 60. The floats 62 can be formed from a foam rubber-like material, HDPE, or the like. The floats 62 can also be hollow, with shells of plastics or other suitable materials.

The inner surface of each float 62 is shaped to correspond generally with the funnel 12 so helping the floats 62 to nest with the funnel 12 when the system 10 is being stored or transported or installed.

The apparatus 10 includes chains 64, or some other form of connecting arrangement, which extend between the flow guide structure 32 and the arms 60. The chains 64 interact with the arms 60 in a manner in which lengths of the chains 64 are adjustable for adjusting the outward pivoting limits of the arms 60. It will be appreciated that any other form of limiting arrangement could be used. For example, the brackets 61 could incorporate a stop arrangement that could be used to limit the outward movement of the arms 60.

The apparatus 10 can also include a diffuser (not shown) in the form of a mesh, grate, or the like, that spans the outlet 20 of the funnel 12.

The apparatus 10 includes a dosing conduit 66 that is mounted on a rim 68 of the upper portion 26 of the funnel 12. The dosing conduit 66 and associated nozzles 70 are shown in some detail in FIGS. 7 to 10. As can be seen, the dosing conduit 66 is circular, for example in the form of a tubular ring, and can be fastened to the rim 68 in a suitable manner. The nozzles 70 are four spaced dosing spouts mounted on the conduit 66 in fluid communication with the conduit 66.

Each nozzle 70 includes a stem 72 that curves through about 90 degrees. The nozzles 70 are mounted on the conduit 66 so that they extend inwardly and downwardly into the funnel 12. An outlet 71 of each nozzle 70 is partially flattened to accommodate the flow of water past the nozzles 70. The nozzles 70 can be in the form of bent metal tubing to be formed in a bending and flattening operation. The conduit 66 can also be of metal so that the stem 72 can be welded to the conduit 66 in fluid communication with openings defined by the conduit 66.

The nozzles 70 are positioned in a region in which water pressure drops below atmospheric pressure as a result of flow of water into the funnel 12. Thus, atmospheric pressure can contribute towards feeding chemicals or dosing compounds from the nozzles 70 and into the water at the inlet 18. An example of a suitable chemical that might be used is chlorine as a solution of sodium hypochlorite. However, other chemicals, such as flocculants and other forms of disinfectants can also be used.

A feed conduit 74 extends into the conduit 66. The feed conduit 74 can be connected to a supply of the dosing compound. This can be in a number of different ways depending on the level of control required.

For example, where little control is required, the feed conduit 74 can simply be connected to a dosing tank. In that case, the chemical can be fed from the dosing tank either through gravity or by atmospheric pressure, referred to above, or both. When making use of the pressure drop at the inlet 18, the faster the flow of water through the funnel 12, the higher the dosage rate because of an increased drop in pressure. The inventor envisages that a metering valve could be provided upstream of the feed conduit 74 to control the dosage rate with a suitable control arrangement connected to the metering valve.

Figure 17:
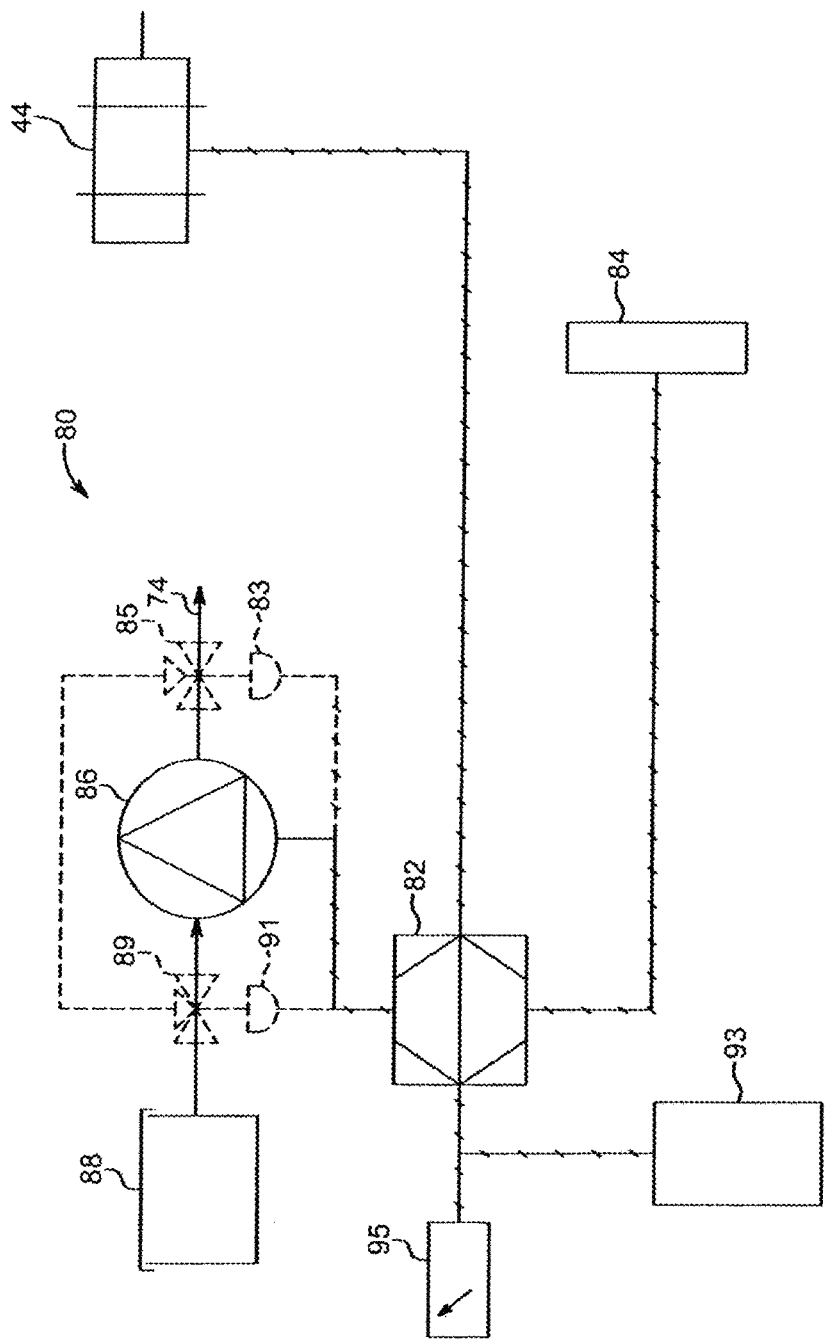
FIG. 17 shows a dosing system that can be used with the apparatus

Alternatively, a system for dosing a reservoir with chemicals can be provided, as referenced with numeral 80 in FIG. 17. The system 80 includes a controller 82. The controller 82 can take a number of different forms. For example, the controller 82 can be a PLC. A chemical sensor 84 is connected to the controller 82 so that the controller can respond to input signals received from the sensor 84.

The controller 82 can be programmed or otherwise configured to perform a number of different actions. These can include controlling the operation of a dosing pump 86. The dosing pump 86 is connected to the feed conduit 74 to supply the dosing conduit 66 with dosing compounds from a storage tank 88. Optionally, the controller 82 can be connected to an actuator 83 of a metering valve 85. While control lines are shown in FIG. 17, the inventor envisages that the controller 82 could be connected to the pump 86, the actuator 83 and the sensor 84 in a wireless manner.

Thus, the controller 82 can be programmed to adjust a dose rate by adjusting operation of the dosing pump 86 or the metering valve 85 based on feedback received from the sensor 84.

It will be appreciated that any number of arrangements can be provided to suit the desired treatment outcomes. For example, a three-way valve 89 can be provided to divert dosing compounds away from the dosing pump 86 when it is not required for a particular application. In that case, an actuator 91 of the valve 89 can be connected to the controller 82 so that water can be directed to the valve 85, which can also be a three-way valve.

Speed of operation of the motor 44 can also affect the extent of dosing due to the drop in water pressure described above. Thus, the controller 82 can be programmed to adjust the speed of operation of the motor 44 based on feedback received from the sensor 84. In that case, the dosing pump 86 can be bypassed, as described above.

The inventor envisages that the controller 82 can be programmed depending on the characteristics of the body of water that is being treated. For example, where the body of water is relatively small, compared to the number of apparatus 10 being used, the extent of dosing would be adjusted accordingly. In some instances, it may be more important to achieve flow across various thermal layers than to achieve a certain chemical balance within the water. In such cases, the controller 82 can be programmed to lower the flow rate generated by the dosing pump 86 and/or to adjust the valve 85 of the valve 89, which can be used to cut off the supply of dosing compound. At the same time, the controller 82 can be used to increase the speed of operation of the motor 44. Of course, the situation could be reversed where the dosage of suitable chemicals is more important than achieving flow across various thermal layers. It follows that the dosing system 80 can be used to achieve control over various parameters related to treatment of the body of water.

It will readily be understood that a number of the sensors 84 can be supplied depending on the application. A suitable multiplexing arrangement can be provided to connect the sensors to the controller 82.

A control panel 93 that includes a suitable interface can be connected to the controller 82 so that an operator can program the controller 82 or otherwise adjust the controller. A gauge 95 can also be connected to the controller 82 to display values generated by the sensor 84.

It will be appreciated that any number of the sensors 84 can be provided. The sensors can also be suitable for measuring other parameters, such as temperature. For example, temperature measurement could provide an indication as to whether or not the flow of water through the funnel 12 needs to be adjusted to disrupt thermoclines in a particular zone in the reservoir.

Figure 18:
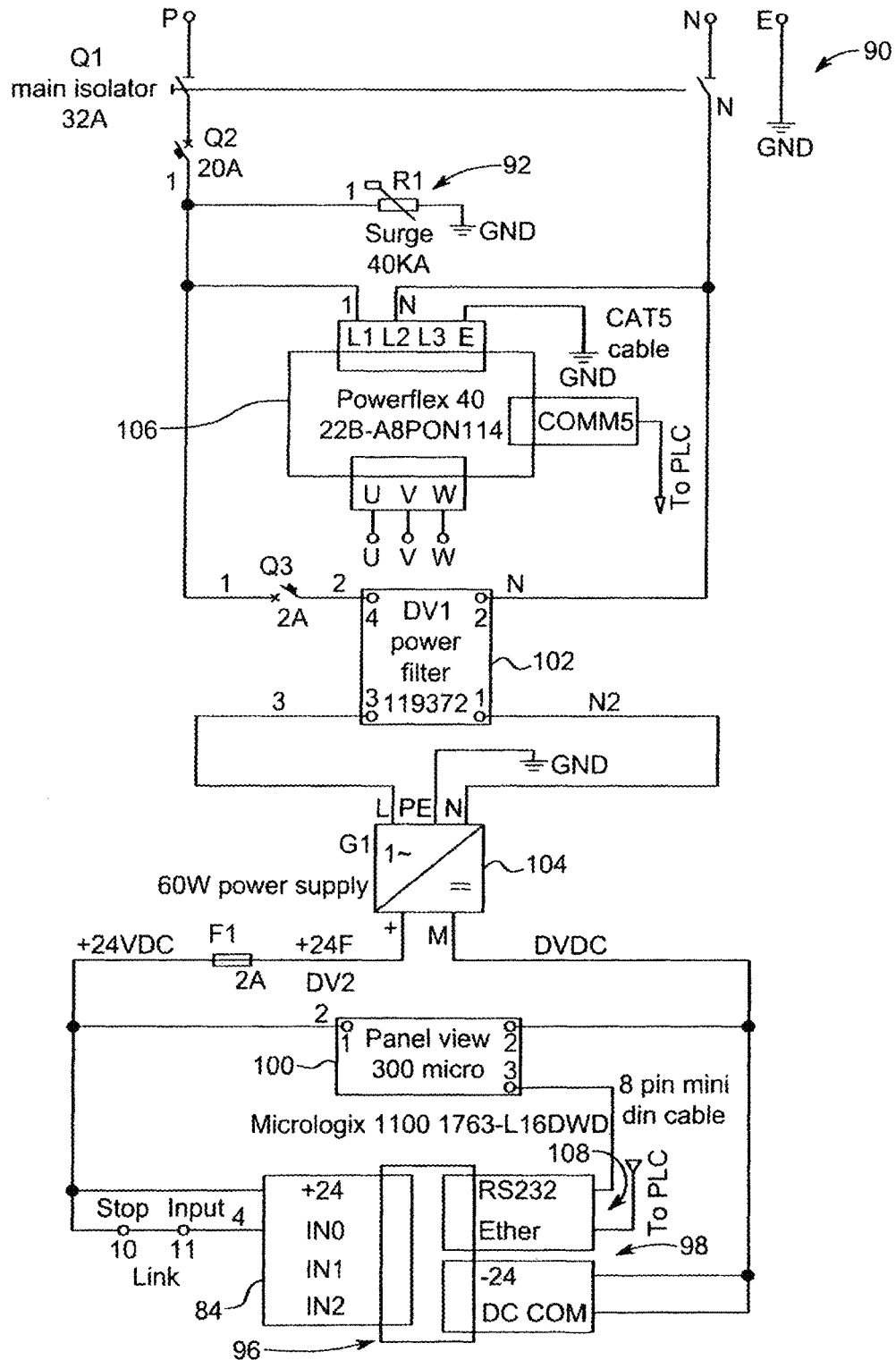
FIG. 18 shows a circuit diagram of part of a control system of the system in FIG. 17.

FIG. 18 shows an exemplary embodiment of a control system 90 suitable for use with the apparatus 10, or a number of the apparatus 10. An AC or DC power supply (not shown) feeds electrical power to the electrical components of the system 90. A surge protector 92 is provided for protecting the electrical components of the system 90 against power surges.

The system 90 includes a programmable controller 96, which can be part of the controller 82, having an I/O interface 98 and a user interface 100 that includes a touch screen. In order to supply power to the controller 96, the AC power is filtered with a power filter 102 and then rectified with a power rectifier 104.

The control system 90 further includes a variable speed drive 106 that is interfaced with the controller 96 for controlling the rotational speed of the motor 44. It will be appreciated that a further variable speed drive can be included to control operation of a motor of the dosing pump 86, if necessary further to control an extent of dosage carried out by the system 80. As described earlier, the extent of dosage can be controlled by a flow rate of water through the funnel 12.

It follows that the control system 90 can include transducers (not shown) that are interfaced with the controller 96. For example, the transducers can include a flow sensor to which the controller 96 responds to control flow of water through the funnel 12. A chemical or pH sensor or other water quality parameter sensor can be interfaced with the controller 96 to control dosing amounts from the dosing system in relation to the flow of water through the funnel 12. These can include the sensor 84 shown in FIG. 17.

The control system 90 also includes a data communication interface 108 for interfacing with remote terminal computing devices (not shown) over a data communication network according to any conventional protocol.

In use, the apparatus 10 is deployed into a reservoir in a substantially upright manner. As the funnel 12 and arms 60 enters the water, the floats 62 cause the arms to pivot until restrained by the chains 64 thereby to stabilize and float the apparatus 10 in an upright position with electrical components above a surface of the water and the inlet 18 of the funnel 12 below a surface of the water.

The controller 82 or 96 is configured appropriately for controlling the motor speed and dosing of water treatment compounds. Water is displaced through the funnel 12 from its upper inlet opening 18 towards its bottom outlet opening 20 to move the water in the reservoir such that the water can circulate from a bottom of reservoir to the top, with the benefits brought by such movement.

Applicant has found that displacing water downwardly through the funnel achieves a greater influence in movement of the surrounding water when compared with displacing water upwardly through the funnel at the same rate. Impellers can impart a swirling motion to upstream water. That sets up a vortex. Vortices result in cavitation. Cavitation is undesirable. The flow guide structure at least negates the swirling motion. Thus, laminar flow out of the funnel is encouraged. The cost per flowrate unit is less for laminar flow that for turbulent flow.

The arms and floats stabilize the funnel in its operative submerged condition. The arms can fold into nesting relationship with the funnel. A resultant footprint reduction facilitates stowing and transport of the system. It also facilitates deployment of the system through an access opening in a roof of a reservoir, for example.

The system includes a controller, which can be the controller 82 or 96 which is accessible over a data communication network for remote interfacing with the controller.

Water experiences a drop in pressure at the funnel inlet. Consequently, dosing compounds can be directed from the nozzles 70 under atmospheric pressure. These are entrained in the water as it flows towards the impeller 52. The dosing compounds can be substantially fully distributed in the water at the funnel outlet. This saves energy that would be used to pump the dosing compounds into the body of water in a conventional treatment system.

Water close to the bottom of the reservoir is influenced to move by directing flow downward. This reduces build-up of organic impurities on the bottom of the reservoir and the internal walls and structures of reservoirs, such as tanks.

The inventor has found that various exemplary embodiments of the apparatus 10 can be used to reduce the dosing amounts by more than 30% when compared with conventional dosing systems.

Geometry of the funnel 12 encourages water to exit the funnel 12 downwardly and radially away from the funnel 12. The radial movement of the water results from the frusto-conical shape of the portion 30 as it tapers outwardly and away from the waist portion 28. Thus, the water can be directed in a more efficient manner towards the floor and corners of a reservoir than if the water was directed or expelled from a straight cylindrical outlet.

The apparatus 10 can be provided in a number of different sizes and capacities depending on the application. Furthermore, the motor 44 and the impeller 52 can be selected to achieve various flow rates depending on the application.

The inventor has tested one embodiment of the apparatus 10 that has the following approximate measurements:
(a) Height (without motor)—1640 mm.
(b) Waist portion diameter—400 mm.
(c) Funnel inlet diameter—550 mm
(d) Funnel outlet diameter—600 mm
(e) Length of upper portion 26—600 mm
(f) Length of waist portion 28—200 mm
(g) Length of lower portion 30—300 mm
(h) Distance of impeller 52 from outlet—400 mm
(i) Diameter of waist portion 28—400 mm
(j) Impeller blade diameter—350 mm (referred to as 400 mm blade diameter)

The inventor was able to achieve a maximum power consumption of 0.75 kW/hr with a flow rate of 75 l/s. A typical operational power consumption was 0.5 kW/hr.

The inventor has found that the dispersal characteristics achieved with the above embodiment and other embodiments of the apparatus can reduce the impact of chlorine residual reductions by up to 45%. The inventor has also found that the above and other embodiments are capable of reducing water surface temperature by up to 0.5 degrees Celsius.

The inventor envisages that the funnel 12 can have various geometries while still providing the benefits of the pressure distribution profile through the funnel 12. However, those geometries should include an upper portion tapering inwardly towards a waist portion, which is straight and which communicates with a lower portion that tapers outwardly.

As can be seen above, the length ratio of the upper portion 26, the waist portion 28 and the lower portion 30 is roughly 3:1:1.5. Also, the diameter ratio of the inlet 18, the waist portion 28 and the outlet 20 is roughly 5.5:4:6. This can be used to provide a guide for a nominal skilled person to fabricate the funnel 12.

The inventor has found that blade diameters of 1000 mm, 3000 mm and 5000 mm (the true values can be less to allow for clearance between blade tips and the funnel) are suitable. Appropriate dimensions of the funnel 12 can be obtained simply by scaling up the above measurements related to the 400 mm impeller blade diameters. Such funnel and blade diameter combinations have produced operational power consumption figures of 1.2 kW/hr for the 1000 mm blade diameter and 5.5 kW/hr for the 5000 mm blade diameter. The inventor envisages the blade diameters can also vary in a range from 400 mm to 5000 mm including all values between these values. The resultant funnel dimensions can vary accordingly.

For deeper reservoirs, it would be appropriate to select a larger blade diameter since it would follow that the overall length of the funnel 12 would increase proportionally or in some other relation to the blade diameter.

The inventor envisages that the measurements of the funnel 12 obtained by scaling in the above manner can be increased by up to between 20% and 50% while retaining functionality of the apparatus 10.

Dimensional ratios between the various portions of the funnel 12 can vary depending on the required application.

It is also envisaged that two or more impellers can be mounted on the shaft. In that case, the relative dimensions related to blade diameter can be retained as above.

Figure 15:
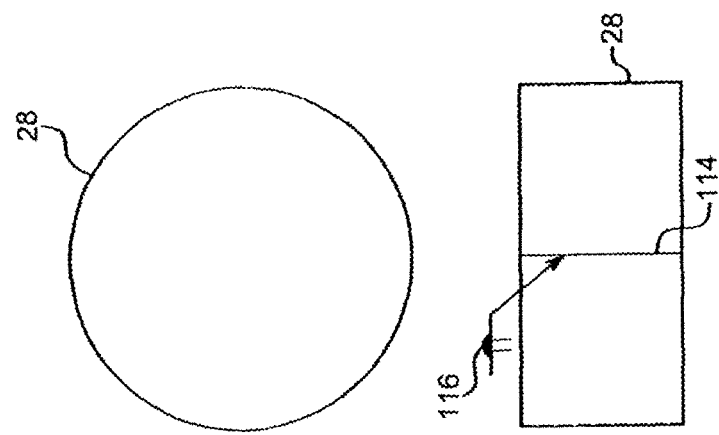
FIG. 15 shows plan and side views of a waist portion of the draft funnel.
Figure 16:
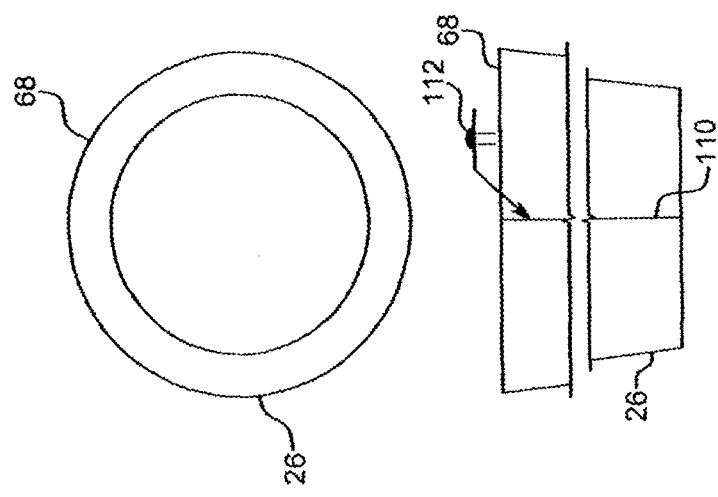
FIG. 16 shows plan and side views of a lower portion of the draft funnel.

In one embodiment, the funnel is of steel, for example stainless steel, and is fabricated from three elements that are welded together. The three elements then define the upper portion 26, the waist portion 28 and the lower portion 30. The three elements are fabricated from flat blanks of stainless steel sheeting that are cut and then rolled to form the elements. These are shown in FIGS. 14 to 16.

Figure 14:
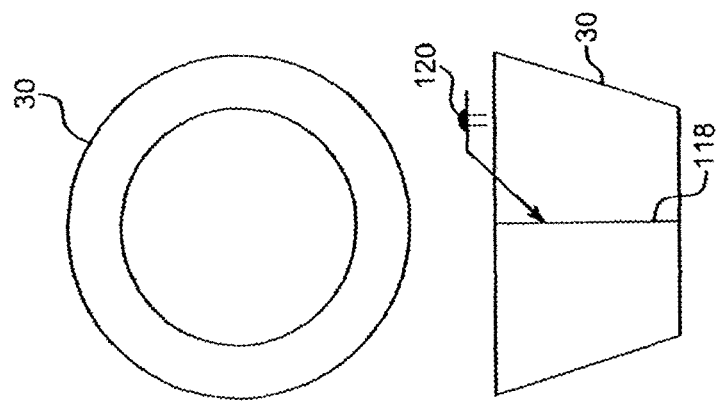
FIG. 14 shows plan and side views of an upper portion of an exemplary embodiment of a funnel for the apparatus.

FIG. 14 shows a plan view and a side view, broken for convenience, of the upper portion 26. As can be seen, edges 110 of the blank are welded together as indicated by a welding bead 112. FIG. 15 shows a plan view and a side view of the waist portion 28. As can be seen, edges 114 of the blank are welded together as indicated by a welding bead 116. FIG. 16 shows a plan view and a side view of the lower portion 30. As can be seen, edges 118 are welded together as indicated by a welding bead 120.

It will be appreciated that water pressure at the inlet of the funnel 12 is relatively low compared to atmospheric pressure. This facilitates feeding of the dosing compounds from the nozzles 70 under atmospheric pressure.

The funnel 12 is effectively a Venturi tube. Thus, a Venturi effect is created in the funnel 12. The Venturi effect is a "jet" effect. According to the laws of fluid dynamics the velocity of the fluid through the waist portion 28 must increase as the water passes through the funnel 12. This results in a drop in pressure through the portion 28 relative to pressure in the portion 26. As a result, the impeller 52 is properly positioned to optimise pumping or water displacement efficiency through the funnel 12.

The lower portion 30 is flared, as described above.

One of the reasons for this is to allow the impeller to recover lost energy or "energy head" as the water exits the waist portion 28 and the water pressure increases substantially back to the level in the upper portion 26. This conservation of pressure head decreases the amount of energy that would be required to pump water through a straight-sided cylindrical tube, for example. The expansion of the water downstream of the waist portion 28 inhibits flow separation, allowing recovery of most of the pressure head. In straight sided tubes or funnels, a main flow can separate from a sidewall resulting in a loss of fluid energy imparted by the impeller.

Another reason for this is to avoid a situation in which the water is directed exclusively downwardly with an insufficient radial flow component. The lower portion 30 is dimensioned so that water exiting the funnel 12 can both reach a floor of the reservoir and can also be directed radially. This contributes to dosing compounds, chemicals or reagents entrained in the water making contact with as many internal components of the reservoir as possible.

As described above, the arms 60 and associated floats 62 are nested against the funnel 12 when the apparatus 10 is inoperative. As can be seen in FIG. 1, the floats 62 are shaped so that an overall plan profile of the apparatus 10 is square. In one example, the arms 60 and floats 62 are dimensioned so that, when inoperative, the apparatus 10 can be lowered, lengthwise, through a 600 mm×600 mm inspection hatch of a reservoir. It follows that the apparatus 10 can be installed and serviced while the reservoir is either on-line or empty. The inventor envisages that the apparatus 10 can be provided in various sizes, examples of which are provided above. Thus, differently sized apparatus 10 will be suited for differently sized inspection hatches.

An embodiment of the apparatus 10 having a 400 mm blade diameter is suited for a reservoir containing about 200 ML (mega-liters) of water. Further apparatus 10 can be used for larger bodies of water. Alternatively, a larger apparatus 10 can be used.

The apparatus 10 can include some form of tethering or anchoring arrangement to retain the apparatus 10 in an operative position. It will be appreciated that this would vary depending on the location of deployment of the apparatus 10.

The apparatus 10 has a number of uses, some of which have been identified above. The manner in which water exits the funnel 12 can result in the elimination of "dead zones" in a reservoir and the issues associates with aged and stagnant water. The disinfection decay rate is minimized due to the dispersal of the dosing compounds by the synergistic operation of the funnel 12, the flow guide structure 32 and the impeller 52. Floor sedimentation and biological build up on internal surfaces and structures within the reservoir is inhibited. Stratification is inhibited. Water surface temperature is reduced, so inhibiting excessive evaporation and possible resultant roof structure corrosion.

The tests carried out by the inventor indicate that energy consumption is within a desirable range. It follows that use could be made of a solar panel array to drive the motor 44.

It is to be understood that the apparatus 10 is able to rest on the floats 62 or the arms 60 while still being operational. Thus, it is not necessary that the apparatus 10 float. It follows that, in some embodiments, the apparatus 10 could be used without the floats, with the funnel 12 and associated components being supported on ends of the arms 60 above a floor or substrate of the reservoir. A length of the arms 60 can be adjustable, for example with a telescoping mechanism, so that a height of the funnel 12 above the floor or substrate can be adjusted. Alternatively, supports can be immersed in the water so that ends of the legs can rest on the supports.

In the specification, including the claims, the term "reservoir" is to be understood as any body of water, such as a lake, a dam or a tank, where induced water movement would be beneficial to distribute dosing compounds, eliminating thermal strata or for the aerobic breakdown of harmful organisms.

Throughout the specification, including the claims, where the context permits, words that describe an orientation of a component are not to be considered as limiting and have been used solely for convenience. Thus, words such as "vertical", "horizontal", "upright", "front", "rear", "upper", "lower", "back", "side" and derivatives, antonyms and similes thereof, are to be regarded as referring to the associated component in an "in use" application and the inventor(s) envisages that such components could be supplied in any number of orientations.

Throughout the specification, including the claims, where the context permits, words that describe a direction of movement of, in this case, water, are not to be considered as limiting and have been used solely for convenience. Thus, words such as "up", "down", "in", "out" and derivatives, antonyms and similes thereof, are to be regarded as referring to the associated component in an "in use" application and the inventor(s) envisages that such components could be supplied in an inoperative condition.

Various substantially and specifically practical and useful exemplary embodiments of the claimed subject matter, are described herein, textually and/or graphically, including the best mode, if any, known to the inventors for carrying out the claimed subject matter. Variations (e.g., modifications and/or enhancements) of one or more embodiments described herein might become apparent to those of ordinary skill in the art upon reading this application. The inventors expect skilled artisans to employ such variations as appropriate, and the inventors intend for the claimed subject matter to be practiced other than as specifically described herein. Accordingly, as permitted by law, the claimed subject matter includes and covers all equivalents of the claimed subject matter and all improvements to the claimed subject matter. Moreover, every combination of the above described elements, activities, and all possible variations thereof are encompassed by the claimed subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any claimed subject matter unless otherwise stated. No language in the specification should be construed as indicating any non-claimed subject matter as essential to the practice of the claimed subject matter.

Thus, regardless of the content of any portion (e.g., title, field, background, summary, description, abstract, drawing figure, etc.) of this application, unless clearly specified to the contrary, such as via explicit definition, assertion, or argument, or clearly contradicted by context, with respect to any claim, whether of this application and/or any claim of any application claiming priority hereto, and whether originally presented or otherwise:

a. there is no requirement for the inclusion of any particular described or illustrated characteristic, function, activity, or element, any particular sequence of activities, or any particular interrelationship of elements;
b. no characteristic, function, activity, or element is "essential";
c. any elements can be integrated, segregated, and/or duplicated;
d. any activity can be repeated, any activity can be performed by multiple entities, and/or any activity can be performed in multiple jurisdictions; and
e. any activity or element can be specifically excluded, the sequence of activities can vary, and/or the interrelationship of elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Moreover, when any number or range or percentage of a value is described herein, unless clearly stated otherwise, that number or range or percentage is approximate. Recitation of ranges of values herein are merely intended to serve as a shorthand method of referring individually to each separate value falling within the range, unless otherwise indicated herein. Each separate value and each separate subrange defined by such separate values is incorporated into the specification as if it were individually recited herein. In addition, all values encompassed by a percentage variation are incorporated into the specification as if it were individually cited herein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc. Similarly if a percentage increase or decrease of x to a value y is provided, the description encompasses all values between y and that increased or decreased value of y.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

The invention claimed is:

1. An apparatus for treating water in a reservoir, comprising:
    a funnel;
    a support assembly for supporting the funnel in a lengthwise upright orientation when the funnel is submerged; and
    a water moving arrangement that is arranged to move water through the funnel in a direction from an inlet at an upper end of the funnel towards an outlet at lower end of the funnel,
        wherein the water moving arrangement includes a motor and an impeller connected to the motor, the impeller being located within a cylindrical waist portion of the funnel,
        wherein a flow guide structure is mounted in the funnel, upstream of the impeller, wherein the flow guide structure includes flow guide vanes, and wherein each flow guide vane has an upstream planar portion and a downstream radially curved portion.

2. An apparatus as claimed in claim 1, wherein the funnel is generally circular in transverse section along its length and is shaped so that it tapers radially inwardly from either end towards the cylindrical waist portion.

3. An apparatus as claimed in claim 1, wherein the support assembly includes a float assembly for keeping the apparatus afloat in the reservoir.

4. An apparatus as claimed in claim 2, wherein the apparatus includes a dosing arrangement that is operatively arranged with respect to a mouth or inlet of the funnel and which is configured to introduce dosing compounds, reagents or other water treatment chemicals or products into the water upstream of the water moving arrangement.

5. An apparatus as claimed in claim 4, wherein the dosing arrangement is at or near the inlet of the funnel, wherein water pressure drops below atmospheric pressure as a result of flow of water into the funnel at the inlet, and wherein a dosing compound is fed into the water by the dosing arrangement due to the drop in atmospheric pressure.

6. An apparatus as claimed in claim 5, wherein the dosing arrangement includes a dosing conduit in the form of a tubular ring that is mounted on or at the inlet of the funnel, the conduit being in fluid communication with a supply of the dosing compound, product or chemical via a feed conduit.

7. An apparatus as claimed in claim 6, wherein a series of nozzles are mounted on the ring, the nozzles extending into the inlet and being configured so that dosing compounds, products or chemicals are fed in the direction of water flow.

8. An apparatus as claimed in claim 3, wherein the support assembly includes a plurality of arms that are mounted pivotally with respect to the funnel, to be pivotally displaceable towards and away from the upper end of the funnel.

9. An apparatus as claimed in claim 8 wherein the float assembly includes a float mounted on each arm.

10. An apparatus as claimed in claim 9, wherein each float is elongated and extends substantially along an entire length of each arm.

11. An apparatus as claimed in claim 10, wherein the floats and arms are configured to deploy by pivoting outwardly as the funnel is lowered into the water.

12. An apparatus as claimed in claim 11, wherein a limiting or stop mechanism is engaged with the arms to limit an extent to which the arms are able to pivot away from the funnel.

13. An apparatus as claimed in claim 9, wherein the floats and arms are shaped to fold and nest against the funnel to allow for insertion into a reservoir opening.

14. An apparatus as claimed in claim 4, wherein the apparatus includes a control system configured for controlling a flow rate imparted by the impeller and consequently a flow velocity of water in the funnel.

15. An apparatus as claimed in claim 14, wherein the control system includes at least one sensor for generating signals based on one or more parameters relating to the water, and a programmable controller and a variable speed drive that is controlled by the controller, the controller being configured for connection to the at least one sensor and to control the flow rate in response to signals generated by the at least one sensor.

16. A method for treating water in a reservoir, the method including the steps of: placing at least one apparatus as claimed in claim 1 in the reservoir; and adjusting a flow rate of water through the funnel by a control system connected to the water moving arrangement, based on signals received from one or more sensors.

\* \* \* \* \*